United States Patent [19]

Lesage

[11] 4,019,693
[45] Apr. 26, 1977

[54] FISHING REEL

[76] Inventor: Jean Lesage, 37 rue Le Campion, 50 Granville, France

[22] Filed: Dec. 2, 1974

[21] Appl. No.: 528,929

[30] Foreign Application Priority Data

Dec. 10, 1973 France .............................. 73.43926
Oct. 11, 1974 France .............................. 74.34270

[52] U.S. Cl. .............................. 242/84.2 B; 43/20; 43/22; 242/84.4
[51] Int. Cl.² .................................... A01K 89/015
[58] Field of Search ............... 242/84.2 B, 84.4; 43/20, 22

[56] References Cited

UNITED STATES PATENTS

| | | | |
|---|---|---|---|
| 2,352,138 | 6/1944 | Torrence | 242/84.2 B |
| 2,535,746 | 12/1950 | Mitchell | 242/84.2 B |
| 2,580,777 | 1/1952 | Hewlett | 242/84.2 B |
| 2,612,325 | 9/1952 | Johnson | 242/84.2 B |
| 2,649,257 | 8/1953 | Shelburne | 242/84.2 B |

*Primary Examiner*—Stanley N. Gilreath
*Assistant Examiner*—John M. Jillions
*Attorney, Agent, or Firm*—William R. Woodward

[57] ABSTRACT

This invention relates to a fishing reel for mounting on a fishing rod, said reel comprising a foot, a spool for winding the line and a support attached to said foot, an elastic return member and a control device for the spool, the paying out of the line being done by casting from one side of the spool whose axis is parallel to the fishing rod during this casting operation and in which automatic clamping of the line is effected by rotation of the spool support under the effect of the elastic force of said return member constituted notably in the form of a tension spring and which is fixed on the one hand to the spool support and on the other hand to said foot, said control device being of the lever type and clamping said spool in casting position and causing, on its actuation, the sudden pivoting through 90° of the axis of the spool relative to said foot thereby bringing said spool into a position perpendicular to the axis of the fishing rod, said reel comprising in addition devices for causing the stacking of the line on the spool during its rewinding associated with the return device and/or the spool and effecting simultaneously the clamping in position of the spool relative to said foot. Said devices for causng the stacking of the line on the spool are constituted by at least one lever with a rigid pin engaging in at least one housing opening whose configuration and dimensions ensure fixing of the pin with a maximum predetermined and limited play.

7 Claims, 14 Drawing Figures

FISHING REEL

The present invention relates to a fishing reel of the spool type in which the paying out of the line is done by unreeling from one side of the spool whose axis is parallel to the fishing rod during this operation, and with automatic clamping of the line by rotation of the spool and the effect of the elastic force of a return member, notably of the torsion spring type fixed on the one hand to the spool support and on the other hand to the foot of the reel and then causing the actuation of a spool control device, of the lever type and clamping said spool in unreeling position, the sudden swivelling through 90° of the axis of the spool relative to the foot of the reel, bringing the spool into a position perpendicular to the axis of the fishing rod, and comprising devices for spreading the line over the spool of the reel, during its re-reeling, associated with the spool return and or control device and simultaneously constituting the position clamping device of the spool support relative to the foot of the reel.

Reels of this type have long been known, useful both in ocean fishing, and in river fishing, whatever the type of fishing practiced and the type of lures used, namely spinners, artificial fish, dead or living fish, worms, etc... Generally speaking such a reel is of simple constitution and comprises a foot of which the base is adapted to the body of the fishing rod and which the other end bears the body of the reel proper, that is to say the spool for winding the line which may be one of the types called "rotary" or "fixed". The first case relates to reels in which the unwinding of the line is achieved, on casting, by rotation of the spool around its axis, the line being drawn by the moving weight of the bottom of the line. In the case of reels with so-called "fixed" spools, the paying out of the line is done from one side of the spool, whose axis is parallel to the axis of the rod which remains stationary in the course of this operation. In this type of reel it is necessary, once the cast has been made, to then replace the spool of the reel by hand, perpendicular to the axis of the rod in order to stop the paying out of the line and to re-reel the latter on said spool.

However, considerable drawbacks are associated with this type of reel. On the one hand and primarily, the line can never be clamped in quasi-instantaneous manner for the obvious reason that it is necessary either to clamp it by hand by gripping it against the rod, which is neither easy, nor accurate, nor rapid, in any case, or to pivot the axis of the spool through 90° by hand to bring it into the line re-reeling position and then to actuate the handle of the reel for the rewinding, causing necessarily, but then only, the cessation of the paying out of the line and the tightening of the latter. Associated with this loss of time and with this quite inaccurate timing and speed of clamping the line, are associated, essentially in the case of a light casting rod with a spinner, for example for river fishing, the almost total inaccuracy in the positioning of the spinner above the water and hence the impossibility of sighting a precise spot, especially in the presence of obstacles such as trees, grasses, etc... as well as the absence of immediate tightening of the line necessary for starting the normal movement of the spinner in the water.

In modern reels comprising a fixed spool whose axis is permanently parallel to the axis of the rod, and in which the re-reeling of the line is done by means of a bight or "pick-up" which lowers when the handle is turned and the line winds on the spool, provide no solution to the problem, nor to the above-indicated drawbacks. In fact, on actuating the handle of the reel, it is always necessary to start to turn the handle through at least a third of a revolution, before the automatic lowering of the bight and hence the stopping of the paying out of the line and its tightening, occur. Moreover this bight system causes accentuated spinning of the line as a result of the re-reeling through coiling the line with a rotary motion. In addition, in a reel of this type there occurs, on paying out of the line, considerable friction against the rims of relatively deep and narrow annular groove of the spool, in which the line is wound, which reduces the performance of such a reel which in any case does not otherwise ensure, for the above indicated reasons, any quasi-instantaneous clamping of the line after the cast.

Certain known reels include an automatic device for quasi-instantaneous clamping of the line comprising a return member acting on the spool support and whose elastic force causes during the actuation of an unclamping control member, the sudden swivelling through 90° of the axis of this spool around the foot of the reel by bringing said axis of the spool into a position perpendicular to the axis of the fishing rod. The advantages obtained with this type of reel consist essentially in the quasi-instantaneous clamping of the line and through this fact in the great accuracy of the moment of arrest and of positioning the end of the line carrying the lure. Thus the latter can be stopped as desired just before it touches the water or just at this precise moment, which is extremely important in the case of light river casting, where the greatest number of strikes are made at the same time when the spinner is just about to touch the water. Moreover the clamping of the line at this precise moment causes the immediate tightening of the line, the spinner touching the water and hence then being made to spin immediately. Such reels are of much simpler constitution than that of modern reels with a retractable bight and of distinctly lower cost price with respect to the latter.

Among this type of reel, certain ones sometimes include also a device for spreading the line evenly over the spool of the reel, which is constituted notably by a sort of thread-guide constituted by a small cylinder whose outer cylindrical surface generally includes two grooves wound in a helix on the cylinder and in which the line is engaged. On re-winding the line on the spool of the reel, the line passing into the grooves of this small cylinder and only being partly wound on the latter, it undergoes a lateral displacement along the axis of said cylinder and the axis of the spool which is parallel to the latter. Through this fact the line is wound on the spool of the reel whilst being evenly spread thereon.

In other cases, the spreading is not caused by such an auxiliary cylinder, but by a spring for example of the relatively rigid helicoidal or spiral type which connects the spool of the reel to the foot of the latter and which, when the fisherman re-winds the line on the reel, is more or less twisted or folded elastically so that the spool, which for this reason oscillates more or less, winds the line with a relative spread.

However these two types of realization of the spreading of the line on the spool of the reel present certain notable drawbacks: in the first case they require the use of an auxiliary cylinder, specially machined helicoidal grooves on its outer cylindrical surface) with a special mounting close to the spool of the reel, which involves additional costs, besides the drawback through which the thread often jumps from one groove to the other and for this reason causes poor spreading of the line, which is non-regular and non-uniform in width. In the case of the spring, it is obvious that uniformity and width of spreading of the line depend on the one hand on the relative rigidity of the spring and on the other hand on the more or less strong torgue exerted by the fisherman's hand on the crank handle of the reel.

It is a particular object of the present invention to overcome these drawbacks, on the one hand by not using an auxiliary cylinder machined with peripheral grooves, and on the other hand by providing different spreading means associated with the spool return and control device and at the same time enabling clamping the support of the spool in position relative to the foot of the reel with uniform and completely accurate and limited spreading of the line on the spool, regardless of the force exerted by the fisherman on re-reeling the line. This problem is resolved according to the invention due to the fact that the said devices for causing the spreading of the line on the spool comprise at least one rigid rod lever engaged in at least one housing opening whose configuration and dimensions ensure fixing of the rod with a pre-determined and limited maximum play.

The essential advantages achieved by the present invention reside in the accuracy and uniformity of the spreading of the line on the spool of the reeling device as well as the simplicity of the means provided for doing this and, also, in the lower cost of the proposed solutions.

In addition, in an advantageous modification of the invention, it is possible to produce a fishing reel mechanism of which a part is entirely integrated in the body of a fishing rod or in a tip of corresponding shape adaptable to an existing type of fishing rod.

By way of example there is described below and illustrated diagrammatically in the accompanying drawing, an embodiment of the device according to the invention.

Figure 1:
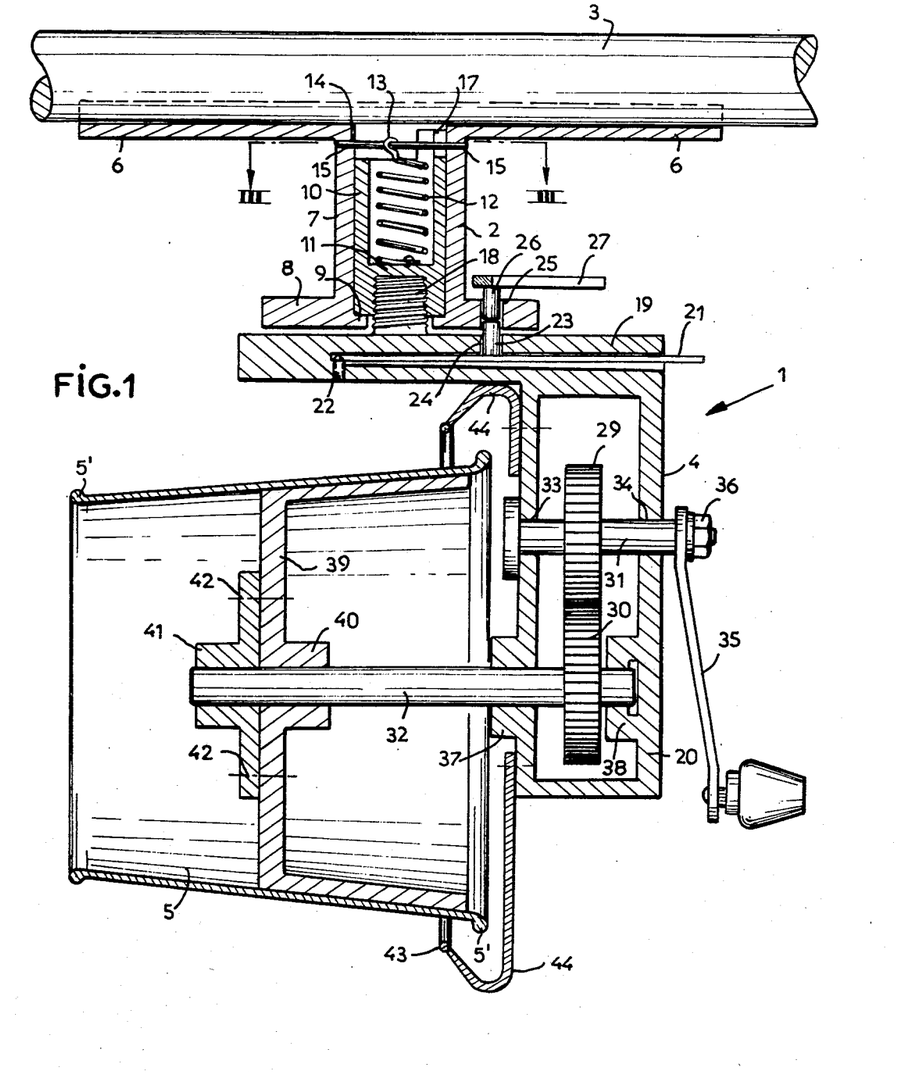
FIG. 1 shows a sectional elevation of the reeling device according to the invention in its position ready for casting.

In FIG. 1 is shown a sectional view of the reeling device 1 having a foot member 2, in this case in the shape of a pedestal, mounted against the fishing rod 3 by means of known conventional fixing or clamping members not shown in the Figure. The foot 2 of the device mounts the pivoted support bracket 4 of the spool 5 on which the line (not shown) is wound. For the description of the various parts of the reel reference is also made to FIGS. 2 and 3 which respectively show a view from above of the reel in its position in FIGS. 1 and 2 and in its position in which the axis of the spool is pivoted through 90° with respect to its position in FIGS. 1 and 2.

The foot 2 of the reel mechanism is composed essentially of a base 6, fixed against the rod 3, and of a cylindrical body 7 comprising at its lower part an outer collar 8 as well as a small inner annular shoulder 9.

Inside this body 7 is arranged, so as to rest on the shoulder 9 and to be able to rotate, a cylindrical sleeve 10 comprising an inner partition 11 bounding two open chambers of which one, upwardly open, contains a spring 12 (which is here of the helicoidal spring type, but which could be a strip spring, a spiral spring, etc . . . ) fast to the partition 11 and whose other end 13 in the form of a ring is engaged on a horizontal rigid rod 14. This rod 14 is fast to the foot of the reel in that it penetrates with a certain relatively small pre-determined play two diametrically opposite openings 15 formed in the top of the cylindrical part 7 of the foot 2. In addition the rod 14 passes into two notches 16 formed in the upper end of the sleeve 10 between two front tongues 17. The play is such that the rod 14 can, whilst being urged against the edges of the tongue 17 under the effect of the spring torque, oscillate slightly in said openings over a small fixed angle of about 15° on each side of its central position.

In addition, the second lower open chamber, of the sleeve 10 carries a tapping which enables a threaded projecting part 18 to be screwed therein, borne by the support part 4 of the spool 5.

This support part 4 of the spool 5 is formed from a horizontal part 19, bearing the part 18, and from a hollowed vertical part 20.

In the part 19 is formed a chamber of elongated shape into which a lever 21 in the form of an elastic strip is welded at 22. This lever bears on its upper surface a pin or finger 23 which projects above the upper surface of the part 19, through a hole 24 of sufficient diameter. In the collar 8 of the foot 2 and at a distance from the axis of the foot equal to the distance of said hole 24 with respect to said axis (which coincides with that of the foot 2) are formed two holes 25′, arranged at an angular distance of 90° and into the first of which extends a pin 26 borne by the lower surface of a tilting lever 27 pivoted at 28 on the collar 8 of the foot 2 (see FIGS. 2 and 3). The pin 26 of this lever 27 comes into contact with the pin 23 of the lever 19 when the device is in the position shown in FIGS. 1 and 2.

The hollow part 20 of the support 4 of the spool 5 is constituted essentially by a sort of parallelepipedic casing in which are arranged two gear wheels 29, 30 preferably with straight teeth, reciprocally enmeshed and whose shafts are denoted respectively by the reference numerals 31 and 32. The shaft 31 is supported at 33 and 34 by bearings not shown in the drawing and is connected to the arm 35 of a crank handle in conventional manner, for example by a bolt or screw 36. The shaft 30 supported by two bearings 37, 38 shown here very diagrammatically and bears at one of its ends a support 39 in the form a frustoconical or cylindrical cup, on which the spool 5 (here of conical shape with low-profile end rims 5') is force-fitted. The spool support 39 is mounted on the shaft 32 by means of a small bushing 40, and is fixed to said shaft 32 by a collar 41 clamped on the shaft, by means for example of bolts 42 not shown in detail, or of similar fixing devices. In addition a member 43 in the form of an encircling ring and fixed to the support member 4 by bent rods 44 is provided to prevent winding of the line outside the spool 5.

Figure 2:
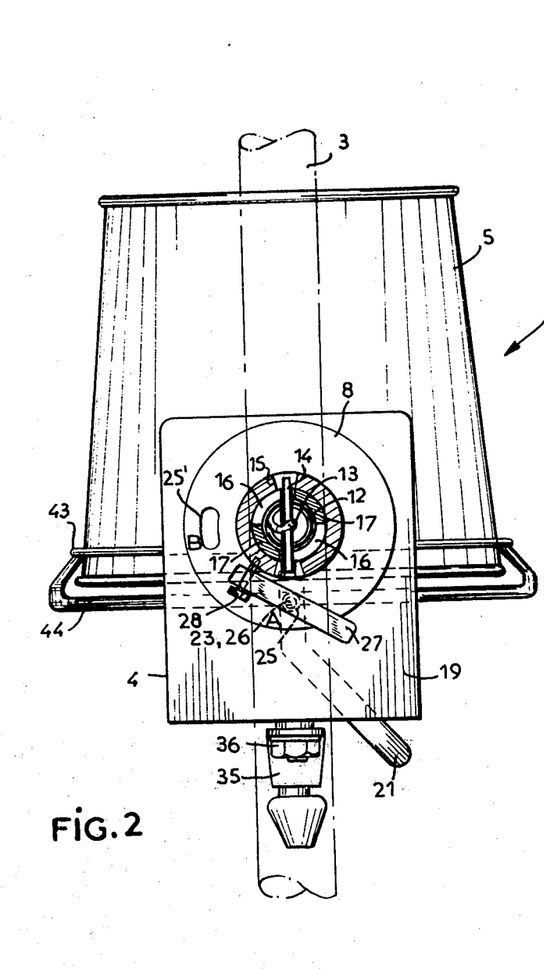
FIG. 2 shows a view from above in partial section along the line III—III of the reeling device shown in FIG. 1
Figure 3:
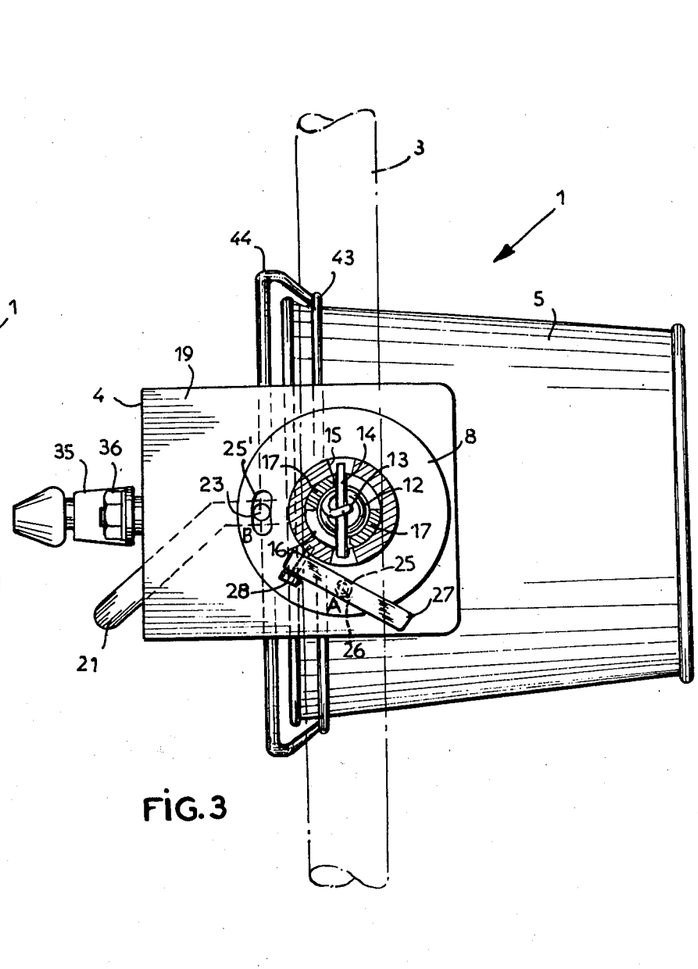
FIG. 3 shows a view from above similar to that of FIG. 2, but after swivelling through 90° of the spool of the device in clock-wise direction.

In this reel, as will be shown by the mode of operation indicated below, the traverse devices designed for causing the distribution of the line over the spool are constituted by the lever with a rigid rod 14 engaged in housing openings 15 formed in the foot 2 of the reel and in the notches 16. The operation of the reel will now be described:

When the angler gets ready to cast, he swings the spool 5 of the reel into the position wherein it is shown in FIGS. 1 and 2, by first pressing on the lever 21, which has the result of unclamping the assembly of the reel 5 and its support member 4 as a result of the disengagement of the pin 23 from the hole 25 of the collar 8 and then swinging the support 4 relative to the foot 2 against the force of the spring 12 until; that is to say that the axis of the spool is then positioned parallel to that of the rod. In this position the holes and 25' of the collar 8 of the foot 2 of the reel are in the position shown in both FIGS. 2 and 3: one is to the left of the axis of the foot whilst the other is located in the axial vertical plane of the rod and covered by the pivoting lever 27 of which the pin 26 enters the said hole. This clamps the spool of the reel in position. In this position, the two front projecting tongues 17 of the cylindrical bushing 10 that is fastened to the spool 5 through the support member 4, do not contact the rod 14. The latter, introduced with a slight amount of play into the openings 15 formed in the foot 2 of the reel, is subjected by the spring 12 to a permanent torque which tends to make it pivot around the axis of the foot in anti-clockwise direction. When the angler proceeds to cast, the line unreels from the spool from its narrow end, and, to clamp it, the angler presses on the lever 27, whose pressing of the pin 26 into the hole 25 of the collar 8 causes the pin 23 of lever 21 to emerge from said hole.

Due to this fact the assembly formed by the spool 5 and by its support member 4 and the bushing 10 is unclamped with respect to the fixed foot 2 of the reel and since the spring 12 exerts permanently through the rod 14, a torque tending to make the fixed foot 2 swivel in anti-clockwise direction, a rotation in clock-wise direction of the assembly 4, 5, 10 with respect to the fixed foot 2 of the reel 1, that is to say with respect to the rod 3 (see FIG. 3), is produced. Through this action the line is clamped in quasi-instantaneous manner since it is no longer paid out from the fixed spool now perpendicular to the direction of paying out. This swivelling of the assembly 4, 5, 10 is necessarily limited to about 90° by means of the second hole 25' of the collar (in order that the axis of the spool should be perfectly perpendicular to that of the rod to enable, as a consequence, the re-clamping of the line). In fact, on rotation of the assembly 4, 5, 10, the rod pin 23 which is centered in a plane passing through the axis of the rod 3, has rotated on a circle having for center the axis of the foot or pedestal 2 of the reel mechanism and passes for this reason from position A to position B, that is to say it arrives in line with the hole 25' corresponding to this position B (to the left of the foot 2) as seen from the angler's position and hence penetrates into this hole under the action of the spring of the lever 21 which tends to push the pin 23 permanently upward. This holding of the spool in position is hence effected automatically and can be rapid, by providing a spring 12 having a high return torque. The angler can then re-reel the line at once on the spool, while the member 43 in the form of a protective ring prevents the line from becoming wound outside of the spool, for example on the shaft 32. It will hence be noted that by reason of the slight pre-determined and limited play allowed the rod 14 in the openings 15 formed in the top of the part 7 of the foot 2 of the device, and in the notches 16, assembly 4, 5, 10 and hence especially the spool 5 can swivel slightly on both sides of its central position (perpendicularly to the rod 3) with a fully limited maximum play on the re-reeling of the line on the spool 5 during operation of the handle 35. The hole 25' at position B likewise allows an amount of play to accommodate the swiveling back and forth just described. This presents the particular and important advantage of distributing the line uniformly over the whole surface of the spool when the angler operates the handle 35.

Figure 14:
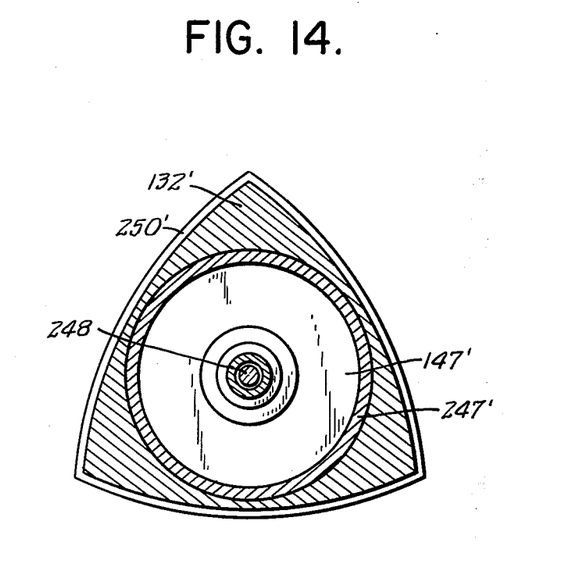
FIG. 14 shows a modification of the spool 132 of FIG. 6 as it would appear if substituted for the spool 132 and viewed in cross section as indicated by the dash-dot line XIV—XIV in FIG. 6.

Besides, the spool 5 may, in another embodiment, be not of frustoconic form, but it a form having a cross-section in the shape of a curvilinear triangle, as shown in FIG. 14 and further described below. In fact the spool 5, being force-fitted, is hence essentially removable and spools of various shapes may be utilised each having application to a particular type of fishing which hence can be of very varied shapes enabling the lure to be given a specific motion, on re-reeling the line, and enabling the use of different types of line.

Figure 4:
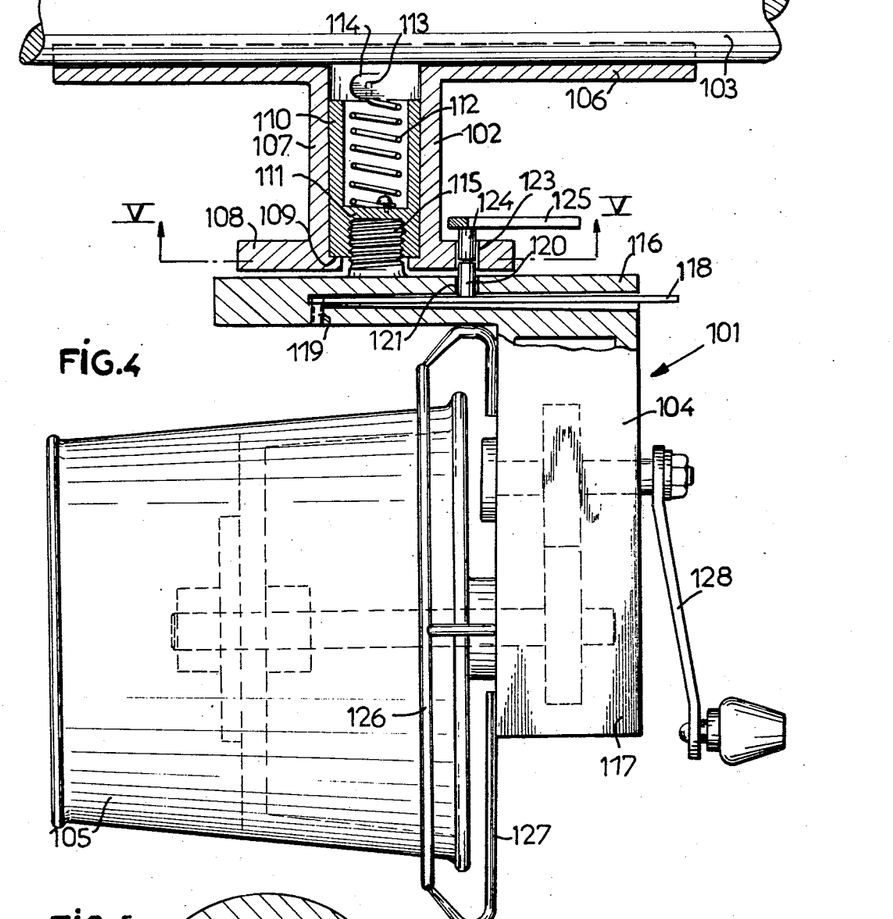
FIG. 4 shows a modification of the reeling device of FIG. 1.
Figure 5:
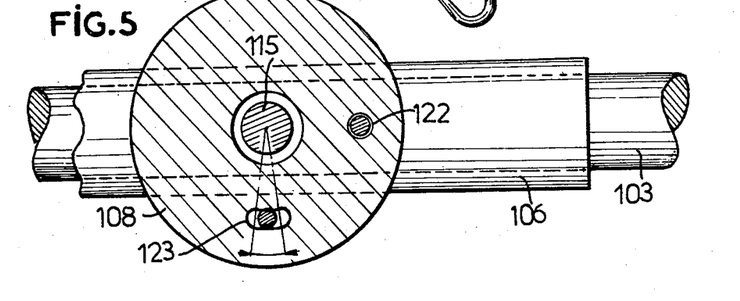
FIG. 5 is a plan view on a larger scale of a part of the foot of the device of FIG. 4, according to the invention.

FIGS. 4 and 5 show an improved modification of the device shown in FIG. 1, which includes some changes representing simplification of the foot and of a part of the support of the spool of the reeling device, although the spool and the whole lower part of its support remain identical with the form of FIG. 1. In this embodiment there are used, as devices intended to cause the distributing of the line over the spool of the reeling device, not a rod fastened to the return spring fixed to the support of the spool of the reel and capable of swivelling with slight play in an opening of the foot of the mechanism, on rereeling of the line as in FIGS. 1, 2 and 3, but rather a rod fastened to a lever of the lever control device of the spool of the reel, fastened to this spool and penetrating at least one opening formed in the foot of the reel and having the form of an elongated aperture, of greater dimensions than those of the diameter of said rod in order to permit free limited angular movement of the latter, the foot of the reel then being simplified in the sense that said return spring is fixed directly in an irremovable manner to the foot itself of the device, without connection by means of an intermediate rod passing through notches and to openings pierced in said foot, as was provided in the embodiment of FIG. 1 indicated previously.

It is obvious that there is thus obtained a simpler constitution of the foot member, requiring a smaller number of parts as well as a reduction in the machining operations necessary.

The reel 101 comprises a foot 102 mounted against the fishing rod 103 by means of known suitable fixing members not shown and fastened as shown to the support member 104 of the spool 105 on which the line not shown is wound. For the description of this reel reference is also made to FIG. 5. The foot 102 of the reel 101 is composed essentially of a base 106 fixed against the rod 103 and a cylindrical body 107 including at its lower part an outer collar 108 as well as a small inner annular shoulder 109 and inside of which is disposed, so as to rest on the shoulder 9 and be rotatable, a cylindrical bushing 110 including an inner partition 111 defining two chambers of which one, upwardly upon, contains a spring 112 (for example a helical spring) fast to the partition 111 and which the other hand 113 is fixed in the body 107 by means of a lug 114 fastened to this body by welding or the like on this body 107. Besides, the second lower and open chamber of the bushing 110 is tapped so as to permit screwing therein a threaded projecting part 115 borne by the support part 104 of the spool 105.

This support part 104 of the spool 105 is formed from a horizontal part 116, bearing the part 115, and a hollow vertical part 117. In the part 116 is formed a chamber of elongated shape in which a lever 118 in the form of an elastic strip is welded at 119. This lever bears on its upper surface a pin or finger 120 which projects above the upper surface of the part 116, through a hole 121 of sufficient diameter. In the collar 108 of the foot 102 and at a distance from the axis of the foot equal to the distance of the hole 121 with respect to said axis (which coincides with that of the foot 102) are arranged a circular hole 122 and an oval hole 123 in the form of an aperture elongated along a circular arc of about 15° for example and which are arranged at an angular distance center to center of 90° and into one of which penetrates a pin 124 borne by the lower surface of a tilting lever 125 hinged on the collar 108 of the foot 2. The pin 124 of this lever 125 comes into contact by abutment with the pin 120 of the lever 118.

The part 117 of the support member 104 of the spool 105 is constituted essentially by a sort of parallelepipedic casing in which is disposed a gear wheel mechanism, described in detail with reference to FIG. 1 and made fast to the shaft of the spool 105 of the reel of constitution identical with that of said shape 1, already described previously. A member 126 in the form of an encircling ring and fixed to the support member 104 by bent rods 127 is in addition provided to prevent winding of the line outside of the spool 105. A crank handle 128 serves for the re-reeling of the line on the spool of the reel.

The operation of the reel is basically as follows: when the angler gets ready to cast, he places the spool 105 of the reel in a position parallel to the rod 103, by pressing for this purpose on the lever 118, which has the effect of unclamping the support member of the spool as a result of the disengagement of the pin and since the from the hole 123 of the collar 108. In this position the hole 122 of the collar 108 of the foot of the reeling device comes into the axial vertical plane of 104, rod and is covered by the pivoting lever 125 whose pin 124 penetrates into said hole. This clamps the spool of the reeling device in position, and in this position the foot 102 of the reel is subjected by the spring 112 to a permanent torque which tends to pivot it around the axis of the foot in anti-clock-wise direction. When the angler proceeds to cast, the line is paid out from the spool by its narrowed end and, to clamp it, the angler presses on the lever 125, whose depression of the pin 124 into the hole 122 causes the pin 120 of the lever 118 to emerge from said hole. In consequence, the assembly formed by the spool 125 and by its support member 124 and the bushing 110 is unclamped with respect to the fixed foot 102 of the reeling device and since the spring 112 exerts constantly through the part 113, a torque tending to make the fixed foot 102 swivel in anti-clock-wise direction, there is hence produced in counteraction a clock-wise rotation of the assembly 104, 105, 110 with respect with the fixed foot 102 of the reeling device 101, that is to say with respect to the rod 103. Through this fact, the line is clamped in quasi-instantaneous manner since it is no longer paid out from the spool now fixed perpendicular to the direction of paying out. This pivoting of the assembly 104, 105, 110 is necessarily limited to 90° (within a pre-determined slight by means of the second hole 123 of the collar (in order that the axis of the spool should be entirely perpendicular to that of the rod to enable in consequence the re-clamping of the line), therein noting that, precisely by reason of the shape of the elongated aperture of the hole 123, the pin 120 is clamped with a pre-determined and limited possible slight play (to about 15°), in the aperture 123 and that hence, notably, the spool 105 can pivot slightly on both sides of its centered position (perpendiculary to the rod 103) on re-reeling of the line on the spool 105 by means of the handle 128 with the advantage of distributing the line over the whole surface of the spool when the angler actuates said handle.

Figure 6:
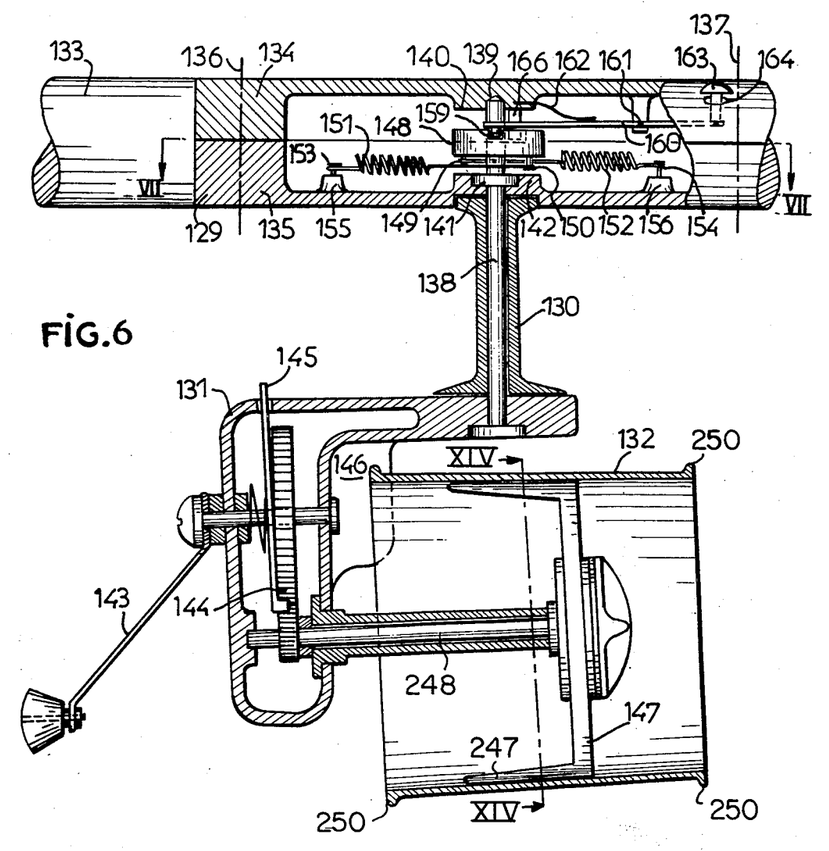
FIG. 6 shows an axial section of a second preferred modification of the reeling device according to the present invention.

In FIG. 6, is shown an axial section of a preferred embodiment of the reeling device in which the elongated aperture is disposed in a part of the support of the spool, whilst the pin lever is then fast to the foot or lose of the member mechanism; in addition, the part of the support of the spool, in which this aperture is formed, can then be constituted by a circular disk on which the elastic return member of the spool is also fixed, whilst, according to another improvement, the assembly of the control devices, for return and clamping with pre-determined slight play of the latter are integrated in the foot of the reel which is then completely located in the body of the fishing rod or in a tubular element fixable on an existing type of fishing rod.

This embodiment of the reel has serveral advantages among which may be mentioned reduced bulk of the foot of member by reason of its compactness and of its integration into the fishing rod or a bushing adaptable to an existing type of fishing rod, a simpler internal constitution of said foot as well as greater life by reason of the very simple arrangement of two fixing springs instead of a single, to which advantages are added a much improved appearance of the assembly.

The reel mechanism includes a foot 129 connected by a bush 130 to the support 131 of the spool of the device. This foot 129 is entirely consolidated with the fishing rod shown very diagrammatically, or with a tip 133 fixable on an existing rod. The foot 129 is formed from two elements 134, 135 in the shape of half-shells or hollow half-cylinders made fast to one another and to the rod or to the tip by suitable fixing devices as shown symbolically by the interrupted lines 136, 137.

For the description reference is also made to the other FIGS. 7 to 10. Into the foot 129 a spindle 138 penetrates of which the upper end enters a corresponding hole 139, formed in a bulge 140 of the upper semi-cylindrical part 134, and which bears a collar 141 resting in a shoulder of form corresponding to a bulge 142 of the lower semi-cylindrical part. The other end of the spindle 138 is rigidly fast to the support 131 of the spool 132 of the reel. The parts 131, 132 are of a well-known type so that their detailed description is superfluous. The support 131 is in the form of a casing bearing a handle 143 rotating the spool through a conventional gear transmission denoted generally by 144. The reference 145 denotes a lever representing diagrammatically an arrest device whilst the reference numeral 146 denotes a thread guide of which at least part overlaps a lateral peripheral part of the spool. In addition the spool 132 is a portion of a cone or of a cylinder having low profile end rims 250 force-fitted on to the skirt 247 of a support 147 of suitable shape, connected by a spindle 248 to the gear device 144. As shown in FIG. 14, the cross-sectional outline of the spool may be in the shape of a curvilinear triangle.

The inside of the foot 129 of the reel contains a circular disk 148 which is clamped on to or is in a single part with the spindle 138 of the support 131 of the spool of the reel. This disk 148 is connected by means of two capped pins 149, 150 to helical springs 151, 152 of which the second ends are engaged on capped pins 154 mounted on projecting studs 155, 156 which are included in the lower semi-cylindrical part 135 of the foot 129. The assembly of the springs and pins is symmetrical with respect to the spindle 138 of the device. Moreover this disk includes two holes 157, 158 (see FIGS. 7, 8, 10) in which a small vertical rod or pin 159 may be engaged, borne by the end of a lever 160 pivoted at 161 on a support fast to the upper semicylindrical part 134 of the foot 129. The end of the lever 160, bearing the small pin 159, is constantly pushed downwardly, that is to say towards the disk 148 by a strip spring 162 (or any other type of spring) enclosed in the part 134 and supported by its curved part against said lever, which bears at its other end a button 163 projecting through an opening 164 from the foot 129. In addition, the disk 148 includes a groove element machined in the form of a recess 165 extending over a circular arc of length about 110°, in which is constantly engaged a fixed stop member 166 fast to the foot 129. In addition, the hole 157 of the disk is circular and its diameter corresponds to a value very little greater than that of the small pin 159 of the lever 160, whilst the hole 158 is constituted in the form of an elongated aperture extending over a circular arc centered on the spindle 138, the aperture angle being preferably of the order of 15°.

Figure 7:
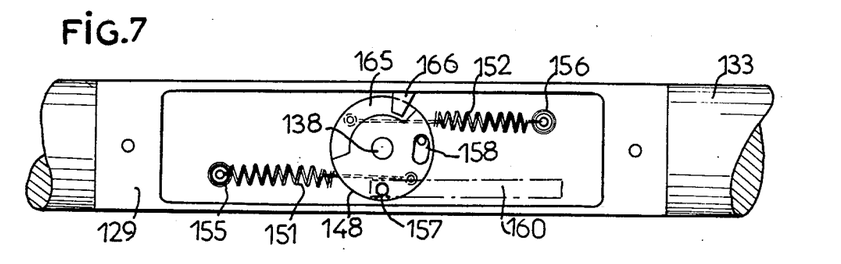
FIGS. 7 and 8 are horizontal sections along the line V—V of FIG. 6, for the two positions at 90° of the reeling spool.
Figure 8:
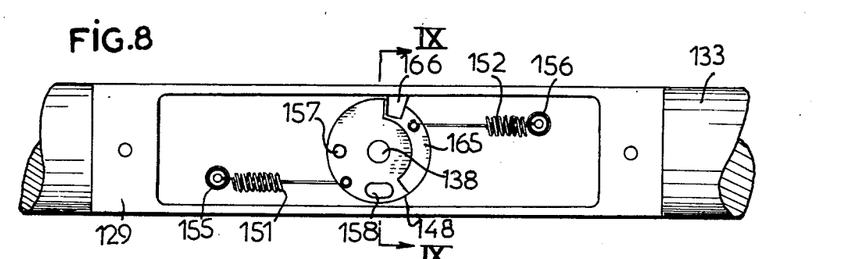
Figure 9:
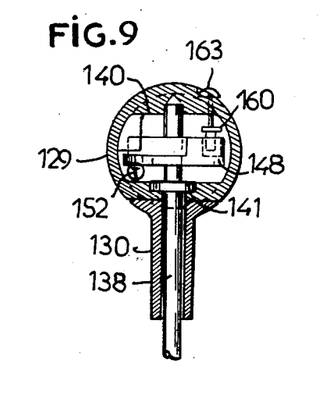
FIG. 9 is a cross section of the foot of the reel mechanism of FIG. 6.
Figure 10:
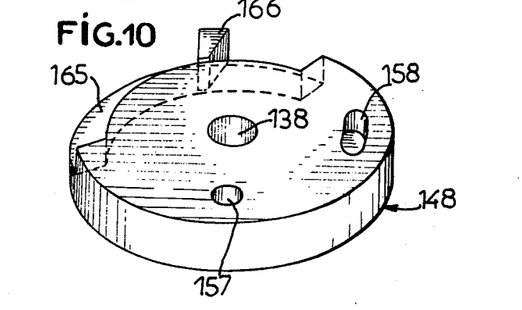
FIGS. 10 and 11 show two embodiments of the clamping disk for the position of the spool of the reel device shown in FIG. 6.

The operation of the reeling device will now be described and for this purpose, reference will be made more specifically to FIGS. 7 and 8. In the position shown in FIG. 7, the angler has placed the axis of the spool of the reeling device parallel to the rod 133 against the force of the springs 151, 152 which are hence tensioned, by causing the spool to swivel and hence the disk 148 in anti clock-wise direction, until the corresponding end of the recess 165 comes into abutment against the stop member 166; the circular hole 157 has come below the pin 159 of the lever 160 pushed back downwardly by the spring 162 and said pin 159 is hence clamped inside said hole. On casting, the line unwinds from the spool and to stop it and clamp it, the angler presses on the button 163, which causes the raising of the pin 159 from the hole 157; through this fact, the action of springs 151, 152 is released and the latter cause the disk 148 to pivot in clock-wise direction thereby bringing the elongated aperture 158 below the pin 159 which is clamped here with the possibility of limited play permitted by its greater dimensions than those of the circular hole 157 and the diameter of the pin. In this position, the spool 132 is at 90° to the previous position and its axis is hence perpendicular to the rod. This is the re-reeling position of the line effected with the handle 143. By turning the latter the angler exerts among other things a torque such that the spool oscillates, due to the limited play permitted to the pin 159 in the aperture 158, around its average position thereby thus causing the distribution of the line over a precise zone of the spool 132.

Figure 11:
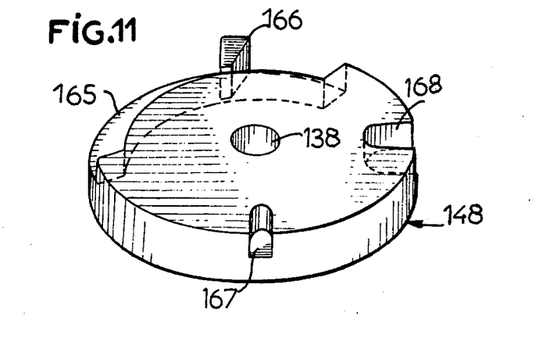

In a modification shown in FIG. 11, there are provided, instead of holes 157, 158, simply notches or machined peripheral recesses 167, 168 which play exactly the same role as the holes 157, 158.

It will be noted that from the point of view of the construction of the foot 129, the two recessed half cylinders provided with different bulges and projecting parts mentioned may be manufactured in a single part by moulding from a preferably light material, such as for example the type known commercially by the name "Duralumin", or indeed of plastics material or the like.

Figure 12:
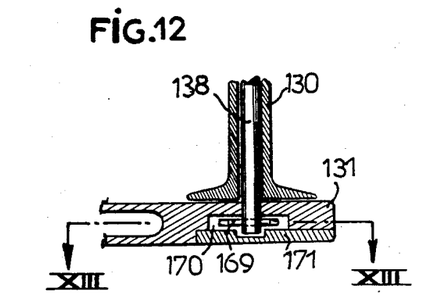
FIGS. 12 and 13 show two sectional views partially broken-away of connection means between a bush and the support of the spool of the reel, in a modified form with respect to the reel construction of FIG. 6.
Figure 13:
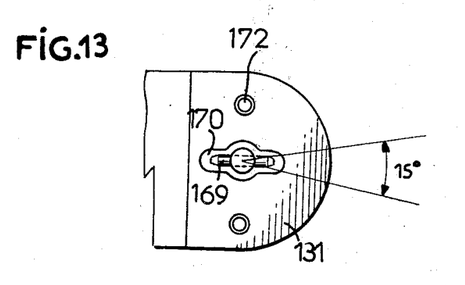

In FIGS. 12 and 13 there are shown respectively two views in partial section of another embodiment of the fixing of the spindle 138 to the support bracket 131 for the spool 132 and its own spindle 248. The support spindle 138 is positioned with limited possible play in the bracket 131 by means of a horizontal pin 169 operable with play of about 15° preferably in an elongated aperture 170 which may be closed by a cover 171 fixed by known means such as screws or bolts indicated by the reference numeral 172. Naturally in this case, the holes or notches 157, 158/167, 168 are both cylindrical and of the same size, the limited and pre-determined play being in fact ensured by the oscillation of the pin 169 in the elongated aperture 170.

FIG. 14 shows a modified form of spool for use with the reeling device of the present invention. FIG. 14 is a cross-section of the spool at a position corresponding to the line XIV—XIV shown in FIG. 6, but with the modified form of spool mounted instead of the circularly frustoconical spool shown in FIG. 6. The support 147' shown in FIG. 14 is of the same shape and mounted in the same manner as the spool support 147 shown in FIG. 6, except that its girth is less than that of the support 147 shown in FIG. 6 in order to allow more clearance between its frustoconical skirt 247' and the bracket 131 (not shown in FIG. 14 — see FIG. 6) to allow for the three thick portions of the spool 132'. The spool 132' is again force-fitted over the support 147, and of course only the part of the spool into which projects the support 147 and its mounting need be hollow. The low-profile rim 250' is provided like the low-profile rim 250 of the spool 132, these being visible in this case because, although the internal circular cross-section of the spool 132' is tapered in diameter in the same way as in the case of the spool 132, to facilitate a force fit, the external surface in this case has no axial taper.

What is claimed is:

1. A fishing reel apparatus comprising, in combination:
   an elongated foot for attachment of the reel apparatus to a fishing rod extending parallel to the direction of elongation of the foot;
   a spool;
   a crank handle and means connecting said handle and said spool together for revolving said spool;
   a support having a mounting for said spool allowing said spool to revolve relative to said support;
   a bushing mounted externally of said foot and interposed between said foot and said spool support;
   a disk mounted within said foot;
   a rotatable shaft fixedly attached to said disk and to the spool support and extending through said bushing;
   a pair of helicoidal springs for elastically urging said disk towards a predetermined relative angular position thereof, being arranged symmetrically with respect to said foot and each having a first end and a second end respectively attached to said foot and to said disk;
   said disk having a first off-center opening and a second circumferentially elongated off-center opening at a mutual circumferential offset of substantially 90°, as measured between centers;
   a control device for selectively indexing the relative angular position of said disk, comprising a lever bearing at one end a control button and at the other end a pin capable of engaging either of said openings and arranged to engage said first opening snugly and to engage said elongated opening with allowance of a limited amount of play;
   said disk being affixed to said shaft with an orientation such that said pin is caused to engage in said elongated opening when the axis of said spool is approximately perpendicular to the longitudinal direction of said foot, and
   a stop member provided on said foot for limiting the rotation of said disk, shaft and spool support to substantially a single quadrant plus an allowance for said play to enable the spool axis to swing in response to cranking forces, said disk having a peripheral groove into which said stop member projects.

2. Fishing reel as defined in claim 1, in which the elongation of said second opening is such as to permit swinging of the axis of the spool through an angle of approximately 15° when said pin is engaged in said second opening.

3. A fishing reel apparatus according to claim 1, further including a fishing rod, said foot being located in the body of said fishing rod which entirely encloses the assembly of the disk springs and associated parts while allowing said control button to be manipulated from the exterior.

4. A fishing reel apparatus according to claim 1, in which the foot is constituted in the form of a section coaxially connectable to the body of a fishing rod.

5. A fishing reel apparatus according to claim 4, in which the spool is constituted by an outer and at least partly hollow spool portion of which the hollow portion is of circular contour, and in which said spool support comprises a shaft, for rotating and carrying the spool, and a bushing affixed to said shaft and on which bushing said outer portion with a circular internal cross-sectional contour is force-fitted.

6. A fishing reel apparatus according to claim 4, in which the spool is constituted by an outer and at least partly hollow spool portion having a cross-section with an external outline in the form of a curvilinear triangle and having external end rims of low profile, and in which said spool support comprises a shaft coaxial with said spool for rotatably mounting the spool and also a piston-like bushing on said shaft having a shape mating with the hollow part of said outer spool portion and on which said outer spool portion is force-fitted.

7. A fishing reel apparatus according to claim 1, further including a fishing rod, wherein said foot comprises a tubular element fixed on said fishing rod which tubular element entirely encloses the assembly of said disk, springs and associated parts while allowing said control button to be manipulated from the exterior.

* * * * *